US006135712A

United States Patent [19]

Chevrollier et al.

[11] Patent Number: 6,135,712

[45] Date of Patent: Oct. 24, 2000

[54] TURBOMACHINE WITH MUTUAL BRAKING OF CONCENTRIC SHAFTS

[75] Inventors: Alain Louis André Chevrollier, Melun; Philippe Charles Alain Lebiez, Draveil; Claude Marcel Mons, Savigny le Temple; Pierre Etienne Mosser, Vanves, all of France

[73] Assignee: Societe Nationale d'Etude et de Construction de Moteurs d'Aviation "SNECMA", Paris, France

[21] Appl. No.: 09/227,879

[22] Filed: Jan. 11, 1999

[30] Foreign Application Priority Data

Jan. 9, 1998 [FR] France .................................. 98 00145

[51] Int. Cl.[7] ...................................................... F01D 25/00

[52] U.S. Cl. .................................... 415/216.1; 415/217.1; 415/229; 415/177; 60/39.75; 416/244 R

[58] Field of Search ......................... 415/0, 174.4, 216.1, 415/217.1, 229, 177, 178; 416/244 A; 60/39.75; 464/183, 179

[56] References Cited

U.S. PATENT DOCUMENTS 3,880,479 4/1975 De Feo et al. .
4,269,903 5/1981 Clingman et al. .
4,427,080 1/1984 Steiger .................................... 464/183

FOREIGN PATENT DOCUMENTS 0 765 951 4/1997 European Pat. Off. .
0 810 152 12/1997 European Pat. Off. .
2 049 629 4/1973 Germany .
2 046 365 11/1980 United Kingdom .
2 080 486 2/1982 United Kingdom .

*Primary Examiner*—Edward K. Look
*Assistant Examiner*—Hermes Rodriguez
*Attorney, Agent, or Firm*—Oblon, Spivak, McClelland, Maier & Neustadt, P.C.

[57] ABSTRACT

A coating (22) with a high coefficient of friction and low thermal conductivity covers a turbomachine low pressure shaft (12) in the vicinity (17) of a concentric high pressure shaft (11), in the area at which high friction contact between the two shafts could occur if a bearing (13) on the low pressure shaft (12) breaks following a failure causing the appearance of an out-of-balance mass. Friction would also more quickly equalize shaft speeds and reduce overheating in them.

2 Claims, 2 Drawing Sheets

TURBOMACHINE WITH MUTUAL BRAKING OF CONCENTRIC SHAFTS

BACKGROUND OF THE INVENTION

1. Field of the Invention

The invention relates to a turbomachine in which two concentric shafts are subject to mutual braking in the case of a failure.

2. Description of the Related Art

A specific example of this situation call be explained with reference to FIG. 1 which illustrates a well known aircraft engine. The engine comprises a rotor 1 surrounded by a stator 2 separated by a main tunnel 3 with an annular cross-section. The main tunnel 3 is occupied by blade stages that are alternately fixed to the rotor and the stator to accelerate and compress gases before taking advantage of the energy released by them as they expand after combustion of the fuel. Working from the front towards the back, there are seen blades of a low pressure compressor 4, blades of a high pressure compressor 5, a combustion chamber 6, blades of a high pressure turbine 7 and blades of a low pressure turbine 8. The rotor 1 is actually composed of two parts; a high pressure rotor body 9 supports the mobile blades of the high pressure compressor 5 and the high pressure turbine 7, and a low pressure rotor body 10 supports the mobile blades of the low pressure compressor 4 and the low pressure turbine 8. Furthermore, the high and low pressure rotor bodies 9 and 10 comprise respectively a high pressure shaft 11 and a low pressure shaft 12 that support them by means of bearings connected to stator 2; thus, working from the front towards the back, there is a front bearing 13 for the low pressure shaft 12, a front bearing 14 for the high pressure shaft 11, a rear bearing 15 for the high pressure shaft 11 and a rear bearing 16 for the low pressure shaft 12. These bearings include one or two ball or roller bearings as the active element, so that shafts 11 and 12 can rotate at high speed independently of each other. Concentric shaft 11 and 12 are completely separated, but it will be seen that they are only separated by a small clearance over a fairly long proximity area 17 located approximately adjacent to the front bearing 14 of the high pressure shaft 11.

Many modern engines have a high compression ratio and a large dilution ratio of combustion gases. They are provided with an auxiliary tunnel 18 surrounding the main tunnel 3, and the air passing through the auxiliary tunnel then mixes with the combustion gases at the back of the low pressure turbine 8. The air which passes along this auxiliary tunnel 18 is accelerated by the blades of a fan 19 fixed to the low pressure rotor body 10, which extends in front of the low pressure compressor 4. The diameter of the blades of the fan 19 is very large, and consequently their inertia is high. They are also the most exposed to bread age when a foreign body such as a bird accidentally enters into the engine.

A large out-of-balance mass appears on the low pressure rotor body 10 as soon as one of the fan blades 19 is broken, which induces very high vibrational forces on it, which are transmitted to the low pressure shaft 12 and the stator 2 through the front bearing 13. Damage caused by these excessive forces can propagate throughout the engine. This is why the front bearing 13 of the low pressure shaft 12 sometimes acts as a fuse if this type of failure occurs. In other words it would break or give way in some other manner.

Many types of frangible bearings are known in prior art, for example as disclosed in U.S. Pat. Nos. 5,417,501 and 5,433,584. They usually provide an incipient failure of stator 2 close to the front bearing 13 which separates the front bearing 13 from the rest of the stator 2; the part providing the incipient failure is usually a thin portion of the stator structure 2 or small diameter connecting bolts in which the threaded rod may be notched. The incipient failure part is designed to tear or break when an out-of-balance mass occurs, such that the front bearing 13 separates from stator 2 so that it no longer supports the low pressure shaft 12 which is then free to oscillate by tipping around the rear bearing 16 without producing any excessive forces on stator 2. In the meantime, the controller is informed of the failure and stops the engine, such that shafts 11 and 12 can gradually slow down and stop. Hopefully, the subsequent repair to the engine will be limited to replacement of the damaged fan blades and the frangible bearing.

Additional and much more serious damage can occur due to tipping of the low pressure shaft 12 around the rear bearing 16 if shafts 11 and 12 come into contact with each other near the proximity area 17 as shown in FIG. 2, since considerable overheating can then occur due to the friction resulting from the rotation speeds of these two shafts 11 and 12, which are very different and very high (for example 4500 rpm and 17000 rpm). The production of heat concentrated at a contact area 21 over a very small angular distance around the circumference of the shafts would be such that the slowest shaft, namely the low pressure shaft 12, could be damaged at this location, and its metallurgical state could be modified, reducing its strength, or it may even be broken or friction welded to the high pressure shaft 11. There is then a risk that the low pressure shaft could break such that the fan would be lost, or at least it would be necessary to replace the low pressure shaft 12 during the repair. Similarly, the high pressure shaft 11 could also be damaged, although it is apparently less vulnerable due to its higher rotation speed so that it passes in front of the contact area 21 which helps to distribute the increase in temperature around its circumference.

SUMMARY OF THE INVENTION

It is an object of the invention to overcome the risks of damage caused by friction over the proximity area of the shafts.

According to an aspect of the invention, the above and other objects are achieved by a turbomachine with a concentric internal low pressure shaft and high pressure external shaft rotating at different speeds, an out-of-balance mass that may occur on the low pressure shaft following a failure, the low pressure shaft being supported by a bearing that breaks in an area lose to the out-of-balance mass when it exists, and by a strong bearing in an area remote from the out-of-balance mass. The low pressure shaft is covered by a coating that can be machined by grinding or equivalent means, and with low thermal conductivity in an area remote from the strong bearing, on a surface facing the high pressure shaft approximately adjacent to the front bearing of the high pressure shaft.

BRIEF DESCRIPTION OF THE DRAWINGS

The invention will now be described with reference to the following figures, in which.

DETAILED DESCRIPTION OF THE PREFERRED EMBODIMENT

Figure 1:
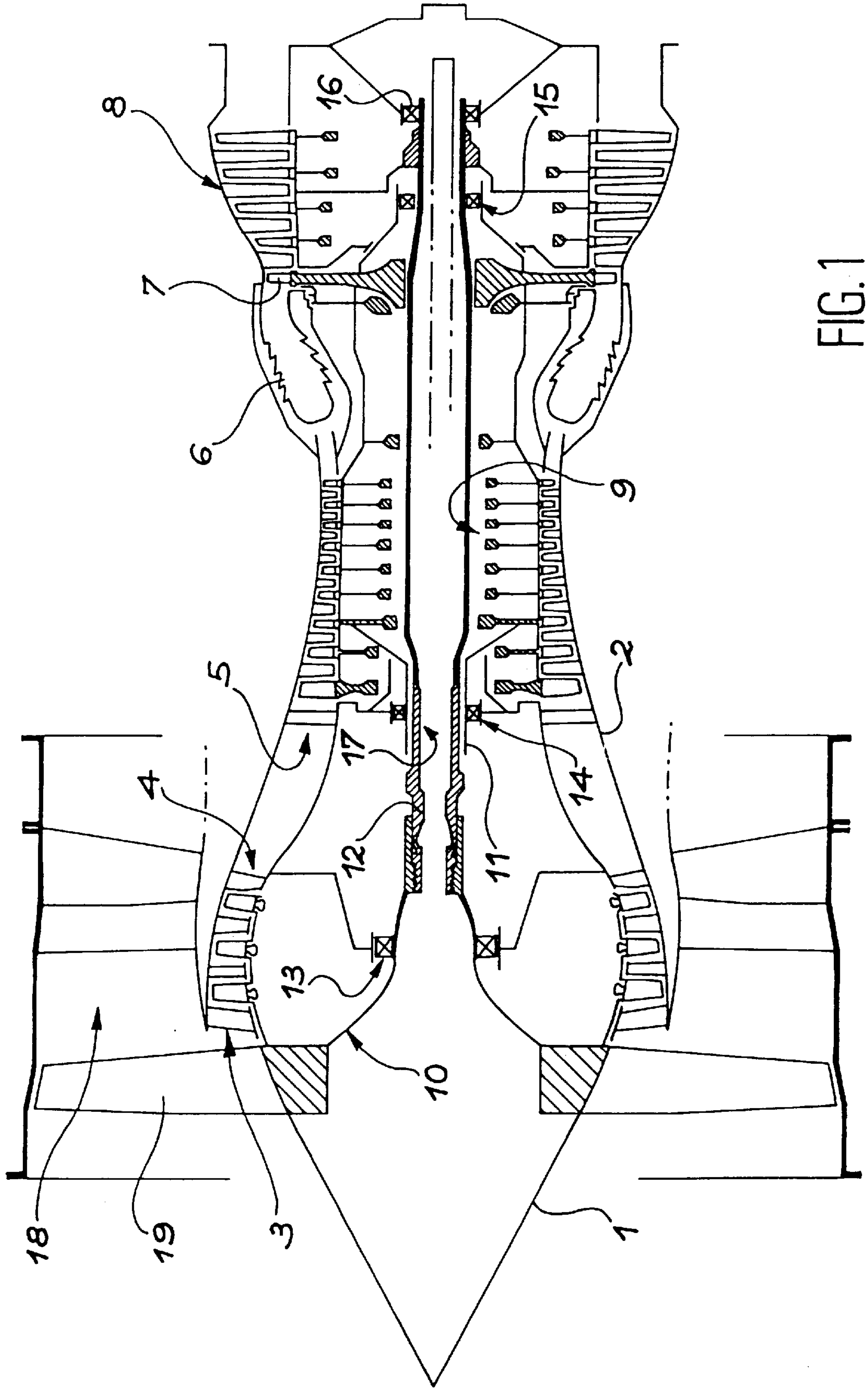
FIG. 1 is a longitudinal sectional view of a turbomachine on which the invention has been installed.
Figure 2:
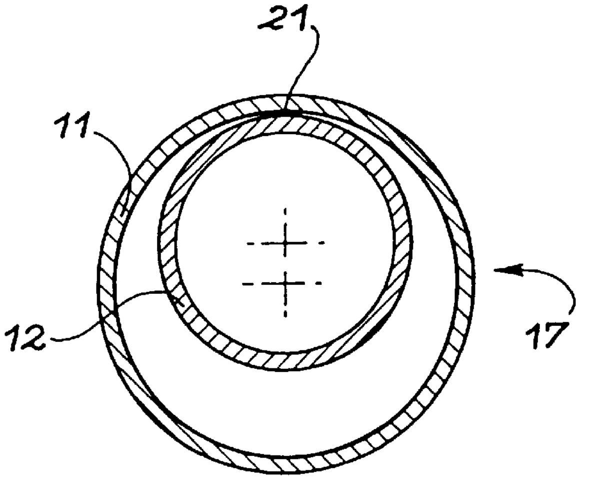
FIG. 2 illustrates a failure situation.
Figure 3:
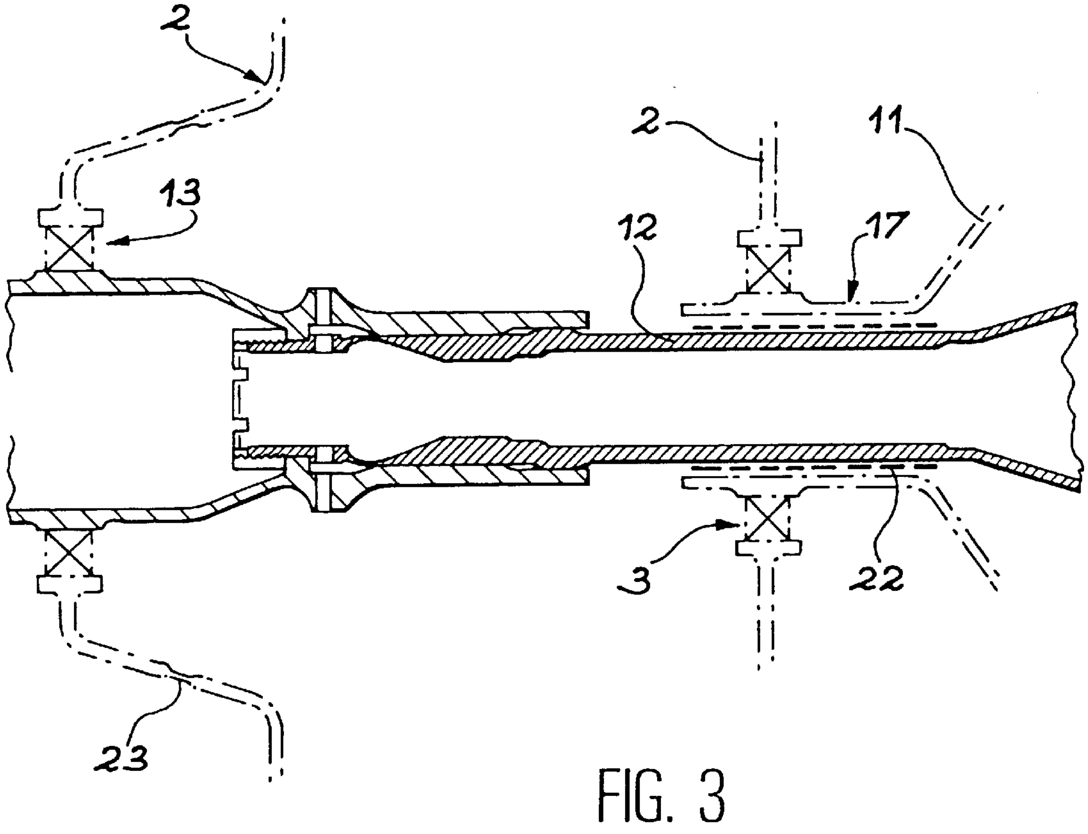
FIG. 3 is an enlargement of FIG. 1 showing the area in which the invention is used.

As illustrated in FIG. 3, the external surface of the slowest shaft (in this case the low pressure shaft 12) facing the faster high pressure shaft 11 is covered with a coating 22 with low thermal conductivity, at the proximity area 17. Furthermore, the coating 22 must have good machinability by grinding or by similar processes, or in other words it must be capable of absorbing high energy by abrading when a mechanical part rubs on it. This property is the opposite of properties required for materials used in ordinary bearings which must have a very low coefficient of friction to reduce friction and to avoid slowing down parts that rub on these bearings. This type of bearing, designed to support a shaft it with an out-of-balance mass without decelerating it, is described in document U.S. Pat. No. 3,880,479.

Compositions or materials suitable for this layer include yttrium coated zirconium, zirconium, aluminum, borides and carbides. U.S. Pat. No. 4,269,903 describes an alloy formed of this type of material, but for a different application of labyrinth seals between a stator and rotor blade ends, in order to reduce gas leakages at this location. These coatings are said to be "abradable", since it is appreciated that they are soft and thus can easily and quickly be sculpted by blade ends while the machine is running in, and afterwards their shape remains invariable and they no longer exert any mechanical effect, particularly friction.

When shafts 11 and 12 rub on each other after a failure that brakes the front bearing 13, frictional contact occurs between the high pressure shaft 11 and the coating 22. Since the coating is a poor heat conductor, the temperature of the low pressure shaft 12 only increases slightly, and the abrasion of the coating 22 by grinding contributes to quickly equalizing shaft speeds 11 and 12 and thus stopping the temperature rise. Therefore, shafts 11 and 12 quickly become frictionally coupled to each other after the controller, informed of the failure, has stopped the engine and they subsequently slow down until they stop completely without any other damage occurring. Finally, any damage that may occur due to friction takes place by degrading either the coating 22 or the high pressure shaft 11; the low pressure shaft 12 holding the fan, which is a safety part, in position remains intact.

An incipient failure part of stator 2 close to the front bearing 13 is illustrated and is marked as a reference 23; it is, in fact, local thinning of stator 2.

In summary, in a turbomachine with a concentric internal low pressure shaft (12) and high pressure external shaft (11) rotating at different speeds, an out-of-balance mass may occur on the low pressure shaft (12) following a failure. The low pressure shaft is supported by a bearing that breaks in an area close to the out-of-balance mass when it exists, and by a stronl, bearing (16) in an area remote from the out-of-balance mass. The low pressure shaft (12) is covered by a coating (22) that can be machined by grinding or equivalent means and with low thermal conductivity in an area (17) remote from the strong bearing, on a surface facing the high pressure shaft (11) approximately adjacent to the front bearing (14) of the high pressure shaft (11).

Obviously, numerous modifications and variations of the present invention are possible in light of the above teachings. It is herefore to be understood that within the scope of the appended claims, the invention may be practiced otherwise than as specifically described herein.

What is claimed is:

1. A turbomachine comprising:

an internal low pressure shaft, the low pressure shaft being supported by a first bearing near a weakened portion which can break to create an out-of-balance mass, and by a second bearing in an area remote from the out-of-balance mass;

an external high pressure shaft external to said low pressure shaft; and an abradable coating having low thermal conductivity covering said low pressure shaft in an area remote from said second bearing and facing the high pressure shaft, said coating being located adjacent a bearing of the high pressure shaft.

2. The turbomachine according to claim 1, wherein the coating is chosen from the group consisting of yttrium coated zirconium, zirconium, aluminum, borides and carbides.

* * * * *